United States Patent
Su

(10) Patent No.: US 10,447,483 B1
(45) Date of Patent: Oct. 15, 2019

(54) SECURE FIRMWARE UPDATES FOR REMOTE VEHICLES

(71) Applicant: SF Motors, Inc., Santa Clara, CA (US)

(72) Inventor: Ao-Jan Su, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 0 days.

(21) Appl. No.: 16/232,976

(22) Filed: Dec. 26, 2018

Related U.S. Application Data

(63) Continuation of application No. 16/016,379, filed on Jun. 22, 2018.

(51) Int. Cl.
| | |
|---|---|
| *H04L 29/06* | (2006.01) |
| *H04L 9/32* | (2006.01) |
| *H04L 9/06* | (2006.01) |
| *G06F 8/65* | (2018.01) |

(52) U.S. Cl.
CPC .............. *H04L 9/3247* (2013.01); *G06F 8/65* (2013.01); *H04L 9/0643* (2013.01); *H04L 9/3226* (2013.01); *H04L 2209/38* (2013.01)

(58) Field of Classification Search
CPC ... H04L 9/3247; H04L 9/0643; H04L 9/3226; H04L 2209/38; G06F 8/65
See application file for complete search history.

(56) References Cited

U.S. PATENT DOCUMENTS

| | | | |
|---|---|---|---|
| 10,057,243 B1* | 8/2018 | Kumar | .................. H04L 9/0825 |
| 2018/0025181 A1 | 1/2018 | Barinov et al. | |
| 2018/0342036 A1* | 11/2018 | Zachary | ................. G06Q 50/30 |
| 2018/0343126 A1* | 11/2018 | Fallah | ................... H04L 9/3265 |

FOREIGN PATENT DOCUMENTS

WO    WO-2017/079652    5/2017

OTHER PUBLICATIONS

Secure Firmware Updates over the Air in Intelligent Vehicles—Communications Workshops|file:///C:/Users/mrahman4/Docunnents/440_Firmwire%20Updates_16232976/NPL/Secure%20Firmware%20Updates%20-%20IEEE%20-2008.pdf|pp. 380-384|Nilsson et al.|2008 (Year: 2008).*
https://www.ericson.com/en/security/data-centric-sercurity/blockchain-data-integrity.
Walker, Heather, "How Digital Signatures and Blockchains Can Work Together" dtd Oct. 3, 2016, 10 pages.

* cited by examiner

*Primary Examiner* — Mahfuzur Rahman
(74) *Attorney, Agent, or Firm* — Foley & Lardner LLP; James De Vellis

(57) ABSTRACT

Systems and methods of secure firmware updates on remote vehicles are provided. The system receives a request from a vehicle for an update to vehicle firmware, and identifies a blockchain address for the vehicle. The system generates a session identifier and identifies a firmware update file. The system generates a digital signature based on a combination of the session identifier and a first hash value of the firmware update file. The system provides, for storage in a block at the blockchain address, the digital signature. The system transmits the session identifier to the vehicle. The system transfers the firmware update file to the vehicle. The vehicle verifies the firmware update file using the digital signature retrieved from the block at the blockchain address, a second hash value of the firmware update file received from the data processing system, and the session identifier received from the data processing system.

20 Claims, 6 Drawing Sheets

US 10,447,483 B1

SECURE FIRMWARE UPDATES FOR REMOTE VEHICLES

RELATED APPLICATIONS

The present application claims the benefit of priority under 35 U.S.C. § 120 as a continuation of U.S. patent application Ser. No. 16/016,379, filed on Jun. 22, 2018 and titled "SECURE FIRMWARE UPDATES FOR REMOTE VEHICLES," which is incorporated herein by reference in its entirety.

BACKGROUND

Vehicles, such as automobiles, can include electronic components. The electronic components can perform functions on or for the vehicle. The vehicle can use the electronic components to facilitate vehicle-related functions, such as driving.

SUMMARY

The present disclosure is directed to systems and methods of secure firmware updates for remote vehicles. A vehicle can include numerous digital hardware components that run or execute firmware. The firmware run by the digital hardware components can be updated periodically to improve the functionality of the digital hardware components. It can be challenging to securely transfer the firmware update file due to network topology issues, cybersecurity threats or attacks, or other accidental or malicious issues that can result in the firmware being altered. Further, it can be challenging to efficiently securely transfer firmware update files without expensive or hard to scale infrastructure.

Systems and methods of the present technical solution provide for secure firmware updates on remote vehicles. The present technical solution can provide an efficient, scalable system for securely transferring firmware updates to remote vehicles. For example, the present technical solution can combine a cryptographic hash (for example: sha256), a session management identifier and generate a digital signature stored in an immutable blockchain transaction. The digital signature can ensure data integrity of the firmware downloaded from a server to the vehicle during an over-the-air software update process. The vehicle can verify the firmware update by comparing a hash value of the firmware update file and the session identifier received from the blockchain with a hash value of the firmware update file and session identifier received from the server. Upon determining a match, the vehicle can proceed with installing the firmware update file.

At least one aspect is directed to a system to perform secure firmware updates on a remote vehicle. The system can include a data processing system. The data processing system can include one or more processors and memory. The data processing system can include one or more of a vehicle identification component, session handler component, firmware controller component, hash component and signature generation component. The data processing system can receive a request via a vehicle interface. The request can be for an update to a firmware executed by a component of a vehicle. The data processing system can identify a blockchain address for the vehicle based on the request. The data processing system can generate, responsive to the request, a session identifier for the request. The data processing system can identify a firmware update file responsive to the request. The data processing system can generate a digital signature based on a combination of the session identifier and a first hash value generated via application of a hash function to the firmware update file. The data processing system can provide, for storage in a block at the blockchain address, the digital signature. The data processing system can transmit the session identifier to the vehicle. The data processing system can transfer the firmware update file to the vehicle. Receipt of the firmware update file by the vehicle can cause the vehicle to verify the firmware update file prior to installation. The vehicle can verify the firmware update file based on a comparison of the digital signature retrieved from the block at the blockchain address with a second hash value generated via application of the hash function to the firmware update file received from the data processing system and the session identifier received from the data processing system.

At least one aspect is directed to a method of performing secure firmware updates on a remote vehicle. The method can be performed by a data processing system. The method can include the data processing system receiving a request via a vehicle interface. The request can be for an update to a firmware executed by a component of a vehicle. The method can include the data processing system identifying a blockchain address for the vehicle based on the request. The method can include the data processing system generating, responsive to the request, a session identifier for the request. The method can include the data processing system identifying a firmware update file responsive to the request. The method can include the data processing system generating a digital signature based on a combination of the session identifier and a first hash value generated via application of a hash function to the firmware update file. The method can include the data processing system providing, for storage in a block at the blockchain address, the digital signature. The method can include the data processing system transmitting the session identifier to the vehicle. The method can include the data processing system transferring the firmware update file to the vehicle. Receipt of the firmware update file by the vehicle can cause the vehicle to verify the firmware update file prior to installation. The vehicle can verify the firmware update file based on a comparison of the digital signature retrieved from the block at the blockchain address with a second hash value generated via application of the hash function to the firmware update file received from the data processing system and the session identifier received from the data processing system.

At least one aspect is directed to a system to perform secure firmware updates on a remote vehicle. The system can include a vehicle interface system having one or more processors and memory. The vehicle interface system can include one or more of a verification component, a blockchain interface component, and a hash component. The vehicle interface system can transmit, to a data processing system, a request for an update to a firmware executed by a component of a vehicle. The request can indicate a blockchain address of the vehicle. The vehicle interface system can receive, from the data processing system, a session identifier generated for the request. The vehicle interface system can transmit, to the data processing system responsive to receipt of the session identifier, a request to download a firmware update file. The vehicle interface system can receive, from the data processing system, the firmware update file. The vehicle interface system can request, from a blockchain system, a digital signature stored at the blockchain address. The digital signature can store or include a first hash value generated based on application of a hash function to the firmware update file, and the session identifier. The vehicle interface system can receive the digital signature from the blockchain system responsive to the request. The vehicle interface system can determine a second hash value based on application of the hash function to the firmware update file. The vehicle interface system can perform a verification of the firmware update file based a comparison of the first hash value with the second hash value, and a comparison of the session identifier of the digital signature and the session identifier received from the data processing system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
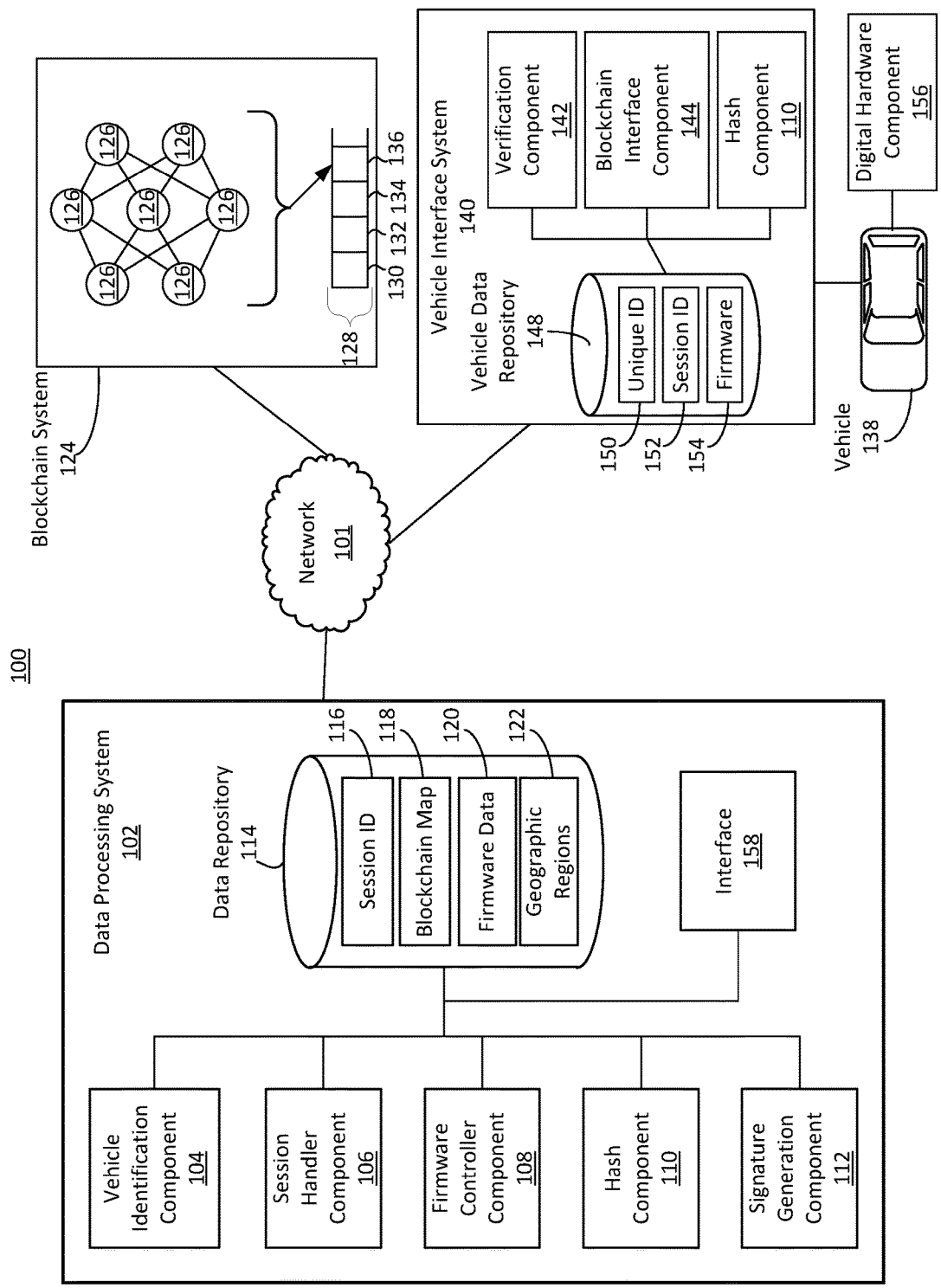
FIG. 1 depicts a block diagram depicting an example system to perform secure firmware updates on a remote vehicle, in accordance with an embodiment.

Following below are more detailed descriptions of various concepts related to, and implementations of, methods, apparatuses, and systems of network-based path generation for a vehicle controller. The various concepts introduced above and discussed in greater detail below may be implemented in any of numerous ways.

The present disclosure is directed to systems and methods of secure firmware updates for remote vehicles. Vehicles such as automobiles can include numerous digital hardware components that run or execute firmware. The digital hardware components can perform critical functions of the vehicle or be integral to critical vehicle systems. The firmware run by the digital hardware components can be updated periodically to improve the functionality of the digital hardware components. As errors, faults, issues, or improvements are identified for the hardware component, a server can transfer a firmware update for the component. However, due to the vehicle being remote from the server and issues associated with a network topology or malicious network attacks, the file transfer may be corrupted or otherwise altered. Installing the corrupted or altered firmware update to the digital hardware component can cause a malfunction or other undesired operation of the critical vehicular system or function. Thus, as the frequency of firmware updates increase for the increasing number of digital hardware components of the increasing number of remote vehicles, it can be challenging to securely provide firmware update files to the remote vehicles using a network. It can be challenging to securely transfer the firmware update file due to network topology issues, cybersecurity threats or attacks, or other accidental or malicious issues that can result in the firmware being altered. Further, it can be challenging to efficiently securely transfer firmware update files without expensive or difficult to scale computing infrastructure.

For example, a vehicle (such as an intelligent vehicle, computerized vehicle, autonomous vehicle, electric vehicle, hybrid vehicle, partially autonomous vehicle, vehicle with driver assistant functionality, car, truck, boat, or motorcycle) can include numerous (e.g., 5, 10, 15, 20, 25, 30, 50, 100 or more) digital hardware components, such as control units, systems, modules, or controllers. These digital hardware components can execute or run firmware, such as software programs, that can be updated periodically to ensure the optimal operations of the vehicle. A server can perform an over-the-air firmware update, which can include transferring the firmware update file over a computer network. The server can perform the over-the-air updates using virtual private network (VPN) tunnels or RSA key pairs (e.g., public-key encryption technology) to encrypt and decrypt the firmware. These cybersecurity measures can prevent the vehicle firmware from being altered (accidentally or maliciously) while transferring the file over the Internet. However, VPN tunnels can include peer-to-peer connections that utilize expensive and difficult to scale computing or network infrastructure. For example, it may cost the vehicle manufacturers millions of dollars to use, expand or build a VPN network carrier to perform a single software update per million of cars they sold. The public/private key technology has the vulnerability that the private key of the vehicle manufacturer might be stolen or hacked by employee or data center operators that have access to the file system. Once the private key is exploited, it would be difficult or challenging for the vehicle manufacturer to recall all the vehicles already on the road to update the vehicle manufacturer's public key stored inside the vehicle.

Systems and methods of the present technical solution provide for secure firmware updates on remote vehicles. The present technical solution can provide an efficient, scalable, and less vulnerable system for securely transferring firmware updates to remote vehicles. For example, the present technical solution can combine a cryptographic hash (for example: sha256), a session management identifier and generate a digital signature stored in an immutable blockchain transaction. The digital signature can ensure data integrity of the firmware downloaded from a server to the vehicle during an over-the-air software update process. The vehicle can verify the firmware update by comparing a hash value of the firmware update file and the session identifier received from the blockchain with a hash value of the firmware update file and session identifier received from the server. Upon determining a match, the vehicle can proceed with installing the firmware update file.

A software over-the-air update can include a transaction that includes downloading a copy of software via a network. The transaction, including the software, can be protected against cybersecurity attacks that can affect the safety of the vehicles associated with the software update. Therefore, systems and methods of the present technical solution can provide firmware over-the-air updates that can prevent or block a vehicle from performing a firmware update using altered firmware.

For example, when a vehicle requests a new firmware from a data processing system (e.g., a server of a vehicle manufacturer or other provider of the firmware), the vehicle can first send the request to the data processing system that includes the vehicle's built-in blockchain address. The data processing system can execute or include an update service or one or more components configured to perform the update service. The data processing system can generate a session identifier ("ID") for this transaction. The data processing system can identify or generate a sha256 hash of the requested firmware. The data processing system can combine the session ID with the sha256 hash to generate a unique digital signature for this transaction. The data processing system can transmit the digital signature to the vehicle's Blockchain address to cause the digital signature to be stored in a transaction record (e.g., an immutable transaction record). The data processing system can send a response to the vehicle with the session ID. The data processing system can send a response to the vehicle with the blockchain's transaction ID. The data processing system can send a response to the vehicle with the session ID and the blockchain's transaction ID.

The vehicle can receive the response from the data processing system and download the firmware from data processing system. The vehicle can obtain the digital signature by querying a blockchain system with the transaction ID it received from the data processing system. After the vehicle finishes downloading the firmware, the vehicle can determine the sha256 hash of the downloaded firmware and validate it with the same hash stored in the digital signature retrieved from the blockchain system. If the vehicle determines that these two sha256 hashes match, then the vehicle can determine that the data has not been modified during the transfer process and it is secure for the vehicle to perform a firmware update with the downloaded file. If the vehicle determines the sha256 hashes are mismatched, the vehicle can determine that the firmware was altered, and then discard the downloaded file.

The present technical solutions provide various technical advantages including, for example: 1) the present technical solution may not require the deployment of hard-to-scale VPN infrastructure; 2) the present technical solution may not rely on pre-built private/public key pairs that can be exploited by malicious users that hacked into the data processing system; and 3) the present technical solution can secures the whole transaction with a digital signature stored in the Blockchain that is immutable and protected against any alteration after it is created by the data processing system.

Thus, systems and methods of the present technical solution can secure the whole over-the-air software update session. The system is scalable and can support numerous (e.g., millions) of cars performing over-the-air ("OTA") updates concurrently. The system does not have pre-built RSA key pairs that are vulnerable to be hacked by malicious users (e.g. ex-employees or data center operators). For example, the system can use the vehicle's blockchain address which does not include sensitive data and cannot be used for cybersecurity attacks to the data processing system.

The disclosed system and methods can be incorporated into or used with vehicles such as gas powered vehicles, hybrid vehicles, electric vehicles (EVs) or autonomous driving vehicles. Vehicles can include automobiles, cars, motorcycles, scooters, passenger vehicles, passenger or commercial trucks, and other vehicles such as sea or air transport vehicles, planes, helicopters, submarines, boats, or drones. Vehicles can be fully autonomous, partially autonomous, or unmanned. Fully autonomous, partially autonomous or unmanned vehicles can include non-electric vehicles such as vehicles based on combustion engines or non-electric engines.

FIG. 1 depicts a block diagram depicting an example system to perform secure firmware updates on a remote vehicle, in accordance with an embodiment. The system 100 can include at least one data processing system 102 for use in performing secure firmware updates on remote vehicles. The data processing system 102 can include at least one vehicle identification component 104, at least one session handler component 106, at least firmware controller component 108, at least one hash component 110, at least one signature generation component 112, and at least data repository 114. The data processing system 102 can include hardware or a combination of hardware and software, such as communications buses, circuitry, processors, communications interfaces, among others. The data processing system 102 can reside on or within a vehicle manufacturing facility. The data processing system 102 can be provided by a manufacturer or other provider of vehicles. The data processing system 102 can include one or more servers, such as a first server and a second server. The one or more servers can be located in a data center, one or more data centers, or geographically dispersed.

The data repository 114 can include or store a session ID data structure 116, a blockchain map data structure 118, firmware data 120, or geographic regions 122. The session ID data structure 116 can include or store session identifiers. Session identifiers can refer to a unique session identifier that is provided or generated by the data processing system 102. The session can refer to a firmware update session to update the firmware or other software program on a component of a vehicle 138, such as a control unit 136. The session can be initiated responsive to a request for a firmware update received from the vehicle 138. The session can be initiated by the data processing system 102. For example, the data processing system 102 can push a firmware update to a vehicle 138 responsive to determining that a firmware update is available for the vehicle 138.

The blockchain map data structure 118 can include or store a blockchain address assigned to a vehicle. A blockchain address can refer to or include a secure identifier. The blockchain address can be assigned to the vehicle 138. For example, the data processing system 102 can assign or otherwise associated a unique blockchain address to each vehicle upon the vehicle being manufactured at a vehicle manufacturing facility. The data processing system 102 can assign or otherwise associate the unique blockchain address to each vehicle upon configuring or setting up the vehicle to for secure firmware updates. The blockchain map data structure 118 can include a unique identifier for the vehicle 138. The blockchain map data structure 118 can map, link, or otherwise associate the unique identifier for the vehicle 138 with the blockchain address assigned to the vehicle. The unique identifier can refer to or include an alphanumeric identifier assigned to the vehicle, such as a vehicle identification number ("VIN"). The vehicle VIN can be the identifying code for a specific vehicle. The VIN can serve as the vehicle's fingerprint, so no two vehicles in operation may have the same VIN. A VIN can include 17 characters (digits and capital letters) that act as a unique identifier for the vehicle. The VIN can display the vehicle's features, specifications and manufacturer. The VIN can be used to track recalls, registrations, warranty claims, thefts and insurance coverage. The VIN can be assigned by a governmental agency or body. The blockchain map data structure 118 can map the VIN or other unique identifier of the vehicle with a corresponding blockchain address assigned to the vehicle.

The firmware data 120 can include one or more software programs or data files. The firmware data 120 can include metadata associated with a software program. The firmware data 120 can include, for example, firmware data files, executable files, time and data stamps associated with creation of the firmware file, compatibility information, provider of the firmware data file, or status information associated with the firmware data file. The firmware data 120 can include a hash value or checksum information for the firmware data file. The firmware data 120 can include instructions as to which vehicles or control units 156 or components thereof are to receive the firmware update. The firmware data 120 can include information about the firmware data size, bandwidth requirements, processor requirements, or time to download or install the firmware update. The firmware data 120 can include criteria for when to download or install the firmware update, such as overnight, when the vehicle is not in operation, or geographic locations of the vehicle. The firmware data 120 can include a history of the vehicles that received the firmware update and whether the firmware updates were successful.

The geographic regions data structure 122 can include information about which geographic regions are authorized for receiving a firmware update. The geographic regions data structure 122 can include historical information about successful or unsuccessful firmware update file transfers. Geographic regions can include geographic locations of a vehicle 138 when the vehicle 138 requested a firmware update or downloaded the firmware update file. A geographic location (e.g., latitude, longitude or street address) can map to a larger geographic region (e.g., a geographic tile, city, town, county, zip code, state, country, or other territory). For example, if a first geographic region is associated with malicious activity that may have resulted in an altered firmware update file transferred to a vehicle 138, the data processing system 102 can store this information in the geographic regions data structure 122 so as to block or prevent other vehicles from downloading firmware update files when the vehicle is located in the geographic region. The geographic regions data structure 122 can include information about successful firmware update file transfers to vehicles so as to mark or flag such geographic regions as authorized or approved for performing a secure firmware update.

The geographic regions data structure 122 can include information about servers or data centers associated with the successful or unsuccessful firmware update file transfers. The geographic regions data structure 122 can also include network addresses (e.g., IP addresses) associated with the servers or data centers. For example, the data processing system 102 can use a first server to transfer the firmware update file to vehicle 138 which may have resulted in the transfer of an altered firmware update file. The data processing system 102 can mark or flag the first server as being hacked or vulnerable to malicious activity, and block or prevent the first server from transferring firmware update files until the issue has been resolved. In the interim, the data processing system 102 can use a second server which may be associated with successful or validated firmware update file transfers.

Each of the components of the data processing system 102 can be implemented using hardware or a combination of software and hardware. Each component of the data processing system 102 can include logical circuitry (e.g., a central processing unit or CPU) that responses to and processes instructions fetched from a memory unit (e.g., memory 615 or storage device 625). Each component of the data processing system 102 can include or use a microprocessor or a multi-core processor. A multi-core processor can include two or more processing units on a single computing component. Each component of the data processing system 102 can be based on any of these processors, or any other processor capable of operating as described herein. Each processor can utilize instruction level parallelism, thread level parallelism, different levels of cache, etc. For example, the data processing system 102 can include at least one logic device such as a computing device or server having at least one processor to communicate via the network 101. A data processing system 102 can communicate with one or more data centers, servers, machine farms or distributed computing infrastructure.

The components and elements of the data processing system 102 can be separate components, a single component, or part of the data processing system 102. For example, the vehicle identification component 104, session handler component 106, firmware controller component 108, hash component 110, signature generation component 112 (and the other elements of the data processing system 102) can include combinations of hardware and software, such as one or more processors configured to perform secure firmware updates on a vehicle, for example. The components of the data processing system 102 can be hosted on or within one or more servers or data centers. The components of the data processing system 102 can be connected or communicatively coupled to one another. The connection between the various components of the data processing system 102 can be wired or wireless, or any combination thereof. Counterpart systems or components can be hosted on other vehicles or systems to enable communication or coordination between such systems.

The system 100 can include, interface, communicate with or otherwise utilize a vehicle interface system 140. The vehicle interface system 140 can include at least one verification component 142, at least one blockchain interface component 144, at least one hash component 110, and at least one vehicle data repository 148. The vehicle data repository 148 can include or store a unique ID 150, session ID 152 and firmware 154. The unique ID can refer to the vehicle unique identifier, such as an alphanumeric identifier assigned to the vehicle, VIN, or blockchain address assigned to the vehicle. The session ID 152 can refer to or include a session identifier assigned to a firmware update session or other type of session between the vehicle 138 and the data processing system 102. The session ID can be provided or generated by the data processing system 102, and stored in the vehicle data repository 148 for further processing to perform a secure firmware update. The firmware 154 can refer to or include a software program or metadata associated with firmware run or executed by a component of the vehicle 138, such as a control unit 156. The control unit 156 can refer to or include any digital hardware component or system of the vehicle 138 that can run or execute firmware or other software program that can receive an update. The digital hardware component can include, for example, an electronic control unit (ECU), engine control module (ECM), Engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Digital hardware components can include systems or components used to provide driver assist functionality or various levels of autonomous driving functionality. Additional types of digital hardware components can include, for example, door control unit (DCU), engine control unit, Electric Power Steering Control Unit (PSCU), Human-machine interface (HMI), Powertrain control module (PCM), Seat Control Unit, Speed control unit (SCU), Telematic control unit (TCU), Transmission control unit (TCU), Brake Control Module (BCM; ABS or ESC), Battery management system (BMS) or a navigation system.

Each of the components of the vehicle interface system 140 can be implemented using hardware or a combination of software and hardware. Each component of the vehicle interface system 140 can include logical circuitry (e.g., a central processing unit or CPU) that responses to and processes instructions fetched from a memory unit (e.g., memory 615 or storage device 625). Each component of the vehicle interface system 140 can include or use a microprocessor or a multi-core processor. A multi-core processor can include two or more processing units on a single computing component. Each component of the vehicle interface system 140 can be based on any of these processors, or any other processor capable of operating as described herein. Each processor can utilize instruction level parallelism, thread level parallelism, different levels of cache, etc. For example, the vehicle interface system 140 can include at least one logic device such as a computing device or server having at least one processor to communicate via the network 101. A vehicle interface system 140 of the vehicle 138 can communicate with one or more data centers, servers, machine farms or distributed computing infrastructure.

The components and elements of the vehicle interface system 140 can be separate components, a single component, or part of the vehicle interface system 140. For example, the verification component 142, blockchain interface component 144, and hash component 110, (and the other elements of the vehicle interface system 140) can include combinations of hardware and software, such as one or more processors configured to perform secure firmware updates on a vehicle, for example. The components of the vehicle interface system 140 can be hosted on or within one or more computing systems. The components of the vehicle interface system 140 can be connected or communicatively coupled to one another. The connection between the various components of the vehicle interface system 140 can be wired or wireless, or any combination thereof. Counterpart systems or components can be hosted on other vehicles or systems to enable communication or coordination between such systems.

The data processing system 102 or vehicle interface system 140 can interface, access, communicate with or otherwise utilize a blockchain system 124 to perform a secure firmware update on a vehicle 138. The blockchain system 124 can include, be composed of, or otherwise utilize multiple computing nodes 126. The computing nodes 126 can include one or more component or functionality of computing device 600 depicted in FIG. 6. The blockchain system 124 can generate, store or maintain a blockchain record 128. The blockchain record 128 can correspond to a blockchain address, such as the blockchain address assigned to the vehicle 138. The blockchain record 128 can include one or more blocks 130, 132, 134 and 136. The blocks in the blockchain can refer to or correspond to a blockchain transaction. The blockchain system 124 can include a distributed network of nodes 126 (e.g., computing systems or computing devices) that store the blockchain 128 having a blockchain address assigned to the vehicle 138. Each block (e.g., 130, 132, 134 or 136) at the blockchain address 128 can include a cryptographic hash of a previous block in the blockchain address 128.

A blockchain (or block chain) can refer to a growing list of records (or blocks) that are linked and secured using cryptography. Each block (e.g., 130, 132, 134 or 136) can include a cryptographic hash of a previous block as well as contain content or other data. For example, block 136 can include a cryptographic hash of block 134; block 134 can include a cryptographic hash of block 132; block 132 can include a cryptographic hash of block 132; and block 132 can include a cryptographic hash of block 130. The blockchain can be resistant to modification of the data stored in the block. The blockchain can be an open, distributed record of electronic transactions. The blockchain record 128 can be distributed among the computing nodes 126. For example, each computing node 126 can store a copy of the blockchain record 128. The computing notes 126 can refer to or form a peer-to-peer network of computing nodes collectively adhering to a protocol for inter-node communication and validating new blocks of the blockchain record 128. Once recorded, the data in any given block (e.g., 130, 132, 134, or 136) cannot be altered retroactively without alteration of all subsequent blocks, which requires collusion of the majority of the computing nodes 126.

By maintaining the blockchain record 128 in a decentralized, distributed manner over the network formed by computing nodes 126, the record cannot be altered retroactively without the alteration of all subsequent blocks and the collusion of the network. The blockchain database (e.g., blockchain record 128) can be managed autonomously using the peer-to-peer network formed by computing nodes 126, and a distributed timestamping server.

Each block 130, 132, 134 or 136 in the blockchain record 128 can hold valid transactions that are hashed and encoded into a hash tree. Each block includes the cryptographic hash of the prior block in the blockchain, linking the two. The linked blocks 130, 132, 134 and 136 form the blockchain record 128. This iterative process can confirm the integrity of the previous block, all the way back to the original genesis block (e.g., block 130).

The network 101 can provide for communication or connectivity between the data processing system 102, vehicle interface system 140 and blockchain system 124. The network 101 can include computer networks such as the internet, local, wide, near field communication, metro or other area networks, as well as satellite networks or other computer networks such as voice or data mobile phone communications networks, and combinations thereof. The network 101 can include or constitute an inter-vehicle communications network, e.g., a subset of components including the data processing system 102 and components thereof for inter-vehicle data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The data processing system 102 can include an interface 158 designed, configured, constructed, or operational to receive and transmit information. The interface 158 can receive and transmit information using one or more protocols, such as a network protocol. The interface 158 can include a hardware interface, software interface, wired interface, or wireless interface. The interface 158 can facilitate translating or formatting data from one format to another format. For example, the interface 158 can include an application programming interface that includes definitions for communicating between various components, such as software components. The interface 158 can be designed, constructed or operational to communicate with one or more vehicle interface systems 140 to perform secure firmware updates. The interface 158 can be designed, constructed or operational to communicate with one or more blockchain systems 158 to conduct a blockchain transaction or store information in a blockchain record 124. The interface 158 can communicate with the blockchain system 124 via a blockchain API.

The interface 158 can receive a request from the vehicle interface system 140. The request can include information, such as what it is a request for, time stamps, vehicle identification information or other information. The request can include a request to perform a firmware update for a digital hardware component 156 of the vehicle. The interface 158 can receive the request via network 101.

The data processing system 102 can include a vehicle identification component 104 designed, constructed or operational to identify the vehicle 138 making the request. The vehicle identification component 104 can receive a unique identifier associated with the request. The unique identifier can be a VIN of the vehicle 138 or other alphanumeric identifier of the vehicle. The vehicle identification component 104 can receive other identifying information associated with the vehicle, such as username, license plate number, address, or registration number.

The vehicle identification component 104 can identify a blockchain address assigned to the vehicle 104. For example, the request can include a unique identifier of the vehicle 138. The vehicle identification component 104 can perform a lookup in the blockchain map data structure 118 using the unique identifier to retrieve, obtain or otherwise identify the blockchain address assigned to the vehicle 138.

The vehicle identification component 104 can determine that the unique identifier received with the request is not associated with a blockchain address. The vehicle identification component 104 can then prompt the vehicle interface system 140 another unique identifier, such as a VIN or username or login identifier that may be associated with the vehicle 138. The vehicle identification component 104 can then perform a second lookup with the second unique identifier in the blockchain map data structure 118 to identify the blockchain address assigned to the vehicle 138.

If the vehicle identification component 104 does not identify a blockchain address assigned to the vehicle 138, the data processing system 102 can determine that the vehicle 138 is not configured to perform secure firmware updates using a blockchain system 124. The data processing system 102 can then notify the vehicle 138 that the vehicle is not configured to perform the secure firmware updates. The data processing system can further instruct, command or otherwise cause the vehicle 138 to generate a request for a new blockchain address. The vehicle 138 can request a new blockchain address using a private key of that blockchain address. The vehicle 138 may transmit the request with the private key over a secure connection, such as a physical hardwired connection to improve security and prevent or mitigate the private key from being compromised or stolen during the transfer. The vehicle 138 can request the blockchain address using the private key responsive to the data processing system 102 indicating to the vehicle 138 that the vehicle 138 is not configured for secure firmware updates. The data processing system 102 can assign the blockchain address to the vehicle 138, and link or associate the unique identifier (e.g., VIN) received with the request to the blockchain address in the blockchain map data structure 118.

The data processing system 102 can include a session handler component 106 designed, constructed and operational to generate a session identifier. The session identifier can correspond to an over-the-air firmware update session. The session can refer to or include a communication session, electronic transaction, request, firmware update request, firmware update session or other session. The session can initiate based on the request from the vehicle 138 to perform a firmware update. For example, the vehicle interface system 140 can initiate the session. The vehicle interface system 140 can determine to update the firmware of a digital hardware component 156. The vehicle interface system 140 can determine to initiate a session with the data processing system 102 to check whether a firmware update is available for one or more digital hardware component 156 of the vehicle 138.

The data processing system 102 can determine to perform the firmware update responsive to detecting or determining that a new firmware update is available for the vehicle 138, and automatically initiate a session to perform the firmware update. The data processing system 102 can periodically (e.g., every 24 hours; 12 hours; 72 hours; 7 days; 30 days, or some other time interval) perform a firmware update or check whether a firmware update is available for a vehicle.

Responsive to initiation or establishment of the session with the vehicle 138, the data processing system 102 (e.g., via session handler component 106) can generate a unique session identifier for the session. The session identifier can include an alphanumeric identifier. The session identifier can be a unique identifier for the session. The session handler component 106 can generate the session identifier based on a combination of the unique identifier for the vehicle 138 (e.g., VIN or blockchain address) and a time and date stamp for the session. For example, the session handler component 106 can input one or more values into a hash function (e.g., provided by hash component 110) to generate a unique session ID for the session. The session handler component 106 can append the unique identifier of the vehicle to the time and date stamp or otherwise combine two or more inputs to generate the session ID. The session handler component 106 can determine the session ID using a random number generator, hash function, cryptographic function, counter, or other technique that can provide a unique identifier for the session. The session handler component 106 can generate the session ID as a random number generated based on the date and timestamp for the session. The session ID can be a version (e.g., version 1, 2, 3, or 4) of a universally unique identifier ("UUID") or globally unique identifier ("GUID") which can be a 128-bit number used to identify the session. For example, the format of the session ID in a textual representation can be sixteen octets of a UUID and represented as 32 hexadecimal (base 16) digits, displayed in five groups separated by hyphens, in the form 8-4-4-4-12 for a total of 36 characters (32 alphanumeric characters and four hyphens).

The session handler component 106 can transmit the session ID to the vehicle 138 that requested the over-the-air firmware update. The session handler component 106 can transmit the session ID via the interface 158 and network 101.

The data processing system 102 can include a firmware controller component 108 designed, constructed and operational to identify a firmware update file responsive to the request and transfer the firmware update file to the vehicle interface system 140. The firmware controller component 108 can access the firmware data 120 to identify the firmware update file being requested by the vehicle interface system 140. For example, the request can include an indication of the type of digital hardware component 156 running the firmware, or a current firmware version or filename. The firmware data 120 may include information about the firmware run by the vehicle 138. The firmware controller component 108 can select the firmware update file to provide to the vehicle 138. The firmware controller component 108 can select the firmware update file to provide based on the version of the digital hardware component 156 or version of the firmware being run by the digital hardware component 156, based on compatibility information with other components or digital hardware components 156 or the vehicle interface system 140. The firmware controller component 108 can select the firmware update file based on geographic information of the vehicle 138, such as the geographic region for which the vehicle 138 is configured, or the location of the vehicle 138 itself.

The firmware controller component 108 can perform a lookup in the data repository 114 to identify a filename, file path, deep link, or a deep web link that is not indexed or searchable, or other pointer or reference to the firmware update file. The firmware controller component 108 can transmit a pointer to the firmware update file to the vehicle interface system 140. The firmware controller component 108 can transmit, transfer, or download the firmware update file to the vehicle 138. The firmware controller component 108 can retrieve the firmware update file using the reference or pointer.

The firmware controller component 108 can perform functionality of a file server, or web server configured to transmit data files. The firmware controller component 108 can encrypt, compress or otherwise package or encapsulate the firmware update data file prior to transferring the firmware update file to the vehicle 138. The firmware controller component 108 can provide the firmware update file as an over-the-air update. The firmware controller component 108 can transfer the firmware update file to the vehicle 138 via network 101.

The data processing system 102 can include a hash component 110 designed, constructed or operational to generate a value based on the selected firmware update file. The hash component 110 can be configured with one or more hash functions or cryptographic functions that can generate a unique value based on the selected firmware update file. For example, the selected firmware update file can be input into the hash function or cryptographic function in order to generate an output value that is unique. If the firmware update file is altered, then the hash function or cryptographic function would generate a different output value. The different output value can indicate that the firmware update files are different or not identical.

The hash function or cryptographic function can include, for example, a message digest function such as an MD5 hash function that can produce a 128-bit hash value. The MD5 hash function can be used as a checksum to verify data integrity of the firmware update file. For example, the firmware update file can be an initialization vector used by the hash function to generate an output value.

The hash function can include a secure hash algorithm 2 ("SHA-2"), such as SHA-224, SHA-256, SHA-384, SHA-512, SHA-512/224, SHA-512/256 that correspond to 224, 256, 384 or 512 bits. The hash function can include a secure hash algorithm 3 ("SHA-3") or other types of hash functions.

The firmware controller component 108 invoke or use the hash component 110 to generate the hash value for firmware update files and store the hash value in the firmware data 120 stored in data repository 114 for further processing or to facilitate performance of the secure firmware update on the vehicle 138. To reduce delay or latency associated with the over-the-air firmware update session, the data processing system 102 can compute the hash values for each firmware update file in an offline process, and store the hash values in the firmware data 120. The firmware controller component 108 can invoke or use the hash component 110 to generate the hash value in real-time, such as subsequent to initiating the session with the vehicle 138 and selecting the firmware update file.

The data processing system 102 can include a signature generation component 112 designed, constructed or operational to generate a digital signature based on a combination of the session identifier and a first hash value generated via application of a hash function to the firmware update file. The first hash value can refer to the hash value generated by the hash component 110 of the data processing system 102. The signature generation component 112 can obtain the first hash value, either from the data repository 114 or from the hash component 110 (or some other component of the data processing system 102). The signature generation component 112 can obtain the session ID from the data repository 114 (e.g., session ID data structure 116) or from the session handler component 106 (or some other component of the data processing system 102). The signature generation component 112 can combine the session ID with the first hash value. The signature generation component 112 can combine the session ID with the first hash value by appending one to the other, for example. The combination of the session ID with the first hash value can create a digital signature of the transaction, where the transaction can refer to the over-the-air firmware update session. The combination can be based on adding the values, convolving the values, multiplying or dividing the values, inputting the values into a function to generate a unique output, or appending the values to one another. The signature generation component 112 can generate the digital signature by combining the hash value with the session ID using bidirectional encryption function. The digital signature can be in a predetermined format in which a first set of bits or bytes correspond to the hash value and a second set of bits or bytes correspond to the session ID.

The data processing system 102 can provide the digital signature for storage in a block 136 or record at the blockchain address 128. The data processing system 102 can provide the digital signature to the blockchain system 124 with an indication of the blockchain address corresponding to the vehicle 138. The blockchain system 124 can generate a new block (e.g., block 136) in the blockchain 128 and store the digital signature in the new block 136. The blockchain system 124 can provide an indication to the data processing system 102 that the new block 136 was successfully created and stores the digital signature generated by the data processing system 102.

The data processing system 102 (e.g., interface 158) can receive an indication that the digital signature was stored in the block 136 at the blockchain address 128. The data processing system 102 can transmit the session identifier to the vehicle 138 responsive to the indication that the digital signature was stored in the block 136 at the blockchain address 128.

The data processing system 102 can receive, from the vehicle 138, a request to download the firmware update file subsequent to transmitting the session identifier to the vehicle 138. For example, responsive to the vehicle interface system 140 receiving the session identifier from the data processing system 102 (which can be responsive to the data processing system 102 receiving an indication from the blockchain system 124 that the digital signature was stored in block 136), the vehicle interface system 140 can transmit a request to the data processing system 102. The request can include a request to download the firmware update file. The data processing system 102 can transfer the firmware update file to the vehicle 138 responsive to the request to download the firmware update file received from the vehicle 138.

When the vehicle interface system 140 of vehicle 138 receives the firmware update file from the data processing system 102 via network 101, the vehicle can perform a verification process or validation process prior to installing the firmware update file or flashing the digital hardware component 156 with the firmware update file. For example, the vehicle interface system 140 can include a verification component 142, blockchain interface component 144 and hash component 110 designed, constructed and operational to verify or validate the firmware update file. Responsive to receipt of the firmware update file and prior to installation of the firmware update file, the verification component 142 can verify the firmware update file based on a comparison of the digital signature retrieved from the block 136 at the blockchain address 128 with a second hash value generated via application of the hash function to the firmware update file received from the data processing system 102 and the session identifier received from the data processing system 102.

To do so, the verification component 142 can invoke, launch, access, execute, call or otherwise communicate with the hash component 110 of the vehicle interface system 140 to generate a hash value of the firmware update file received from the data processing system 102. The hash component 110 of the vehicle interface system 140 can include one or more component or functionality as the hash component 110 of the data processing system 102. The vehicle interface system 140 can use the same hash function used by the data processing system 102 in order to generate a hash value of the firmware update file received from the data processing system 102. The vehicle interface component 110 can store the generated hash value in the vehicle data repository 148 (e.g., in the firmware data structure 154) for further processing to perform the secure firmware update on the vehicle.

The verification component 142 can invoke, launch, access, execute, call or otherwise communicate with the blockchain interface component 144 to query the blockchain system 124. The blockchain interface component 144 can include one or more component or functionality of the interface 158 used to interface with the blockchain system 124, such as a blockchain API. The blockchain interface component 144 can construct the query using the blockchain address of the vehicle stored in the unique ID data structure 150 of the vehicle data repository 148.

For example, the blockchain interface component 144 of the vehicle interface system 140 can be configured with a query language or REST APIs configured to query the blockchain for information such as transaction data (e.g., digital signature) in blocks (e.g., block 136). The blockchain interface component 144 can communicate with one or more nodes 126 in the blockchain system 124 to obtain the digital signature stored in block 136. For example, the blockchain interface component 144 can obtain the digital signature stored in block 136 responsive to a certain percentage (e.g., 25%, 30%, 40%, 50%, 51%, 60%, 70% or more) of the nodes 126 in the blockchain system 124 verifying the data stored in block 136 on each of the respective nodes 126.

The blockchain interface component 144 can receive a response from the blockchain system 124 (or a node 124 thereof) that includes the digital signature from block 136, which was previously stored in block 136 by the data processing system 102. The verification component 142 can receive the digital signature via the blockchain interface component 144. The verification component 142 can parse the digital signature to identify a session ID and the first hash value. For example, if the digital signature was generated using a bidirectional encryption function, then the verification component 142 can use a decryption function that corresponds to the encryption function in order to decrypt the digital signature and identify the session ID and hash value stored therein. Example bidirectional encryption functions (or two-way encryption functions or reversible encryption function) used by the data processing system 102 to generate the digital signature can include a symmetric key encryption. The session ID can be stored in the digital signature by the data processing system 102. The first hash value can correspond to the hash value generated by the data processing system 102 using the firmware update file.

The verification component 142 can compare the session ID received from the digital signature received from the block 136 with the session ID received from the session handler component 106 of the data processing system 102. If the session IDs match (e.g., correspond to the same over-the-air update session), the verification component 142 can proceed to comparing the hash values to determine if the hash values also match. The verification component 142 can compare the first hash value obtained from the digital signature obtained from block 136 with the second hash value computed by the hash component 110 of the vehicle interface system 140 from the firmware data file received from the data processing system 102. If the verification component 142 determines that the first and second hash values match, then the verification component 142 can determine that the firmware data file received from the data processing system 102 is the same as the firmware update file transmitted by the data processing system 102 (e.g., not altered) and authorize the firmware update file to be installed or flashed to the digital hardware component 156.

If the session IDs and first and second hash values match (e.g., are identical or the same), then the verification component 142 can store the firmware update file in the vehicle data repository 148 for later installation on the digital hardware component 156. The vehicle interface system 140 can, for example, schedule the installation for a later time or date when the vehicle 138 is not in operation, is stored at a home or base location, is plugged into power, or is otherwise situated or configured in a manner that facilitates a secure and safe flash update of a digital hardware component 156.

The verification component 142 can use one or more techniques to determine the match. For example, the verification component 142 can combine the session ID and hash value to generate a second digital signature and compare the second digital signature with the digital signature obtained from the blockchain system 124 (e.g., first digital signature). The verification component 142 can generate the second digital signature using the same bidirectional encryption function used by the signature generation component 112 to generate the first digital signature stored in the blockchain 128.

If the verification component 142 determines that the session IDs or digital signatures do not match do not match, then the vehicle interface system 140 can block or prevent flashing of the digital hardware component 156 with the received firmware update file. The verification component 142 can discard, delete or remove the received firmware update responsive to determining that the session IDs do not match. The vehicle interface system 140 can transmit a new request to the data processing system 102 to initiate a new over-the-air firmware update session responsive to determining the session IDs do not match.

If the verification component 142 determines that the first and second hash values or digital signatures do not match, then the vehicle interface system 140 can block or prevent flashing of the digital hardware component 156 with the received firmware update file. The vehicle interface system 140 can invalidate the firmware update file based on the first hash value being different from the second hash value, or the session identifier from the digital signature being different from the session identifier received from the data processing system. The verification component 142 can discard, delete or remove the received firmware update responsive to determining that the first and second hash values do not match. The vehicle interface system 140 can transmit a new request to the data processing system 102 to initiate a new over-the-air firmware update session responsive to determining the first and second hash values do not match.

Thus, if the first and second hash values do not match, the verification component 142 can determine that the received firmware update file was corrupted or altered, either accidentally or maliciously, and can prevent installation of the firmware update file on the digital hardware component 156. The verification component 142 can further provide a notification or alert to the data processing system 102 of the detected corruption or alteration. The verification component 142 can provide information along with the alert, such as a time and date stamp, location of the vehicle 138, type of network (e.g., WIFI, cellular network, short range wireless communication, mesh network) used to download the firmware update file, configuration of the vehicle 138, or type of digital hardware component 156.

The data processing system 102 can receive, subsequent to invalidation of the firmware update file by the vehicle 138, a second request from the vehicle interface system 140. The second request can be a request for the same update to the firmware executed by the digital hardware component 156 of the vehicle 138. The data processing system 102 can perform the same process to establish a new session ID, digital signature, block and transfer the firmware update file.

The data processing system 102 can change a parameter or other aspect of the process in order to circumvent the attack in order to perform the secure firmware update on the vehicle without an altered firmware update file. For example, if the vehicle interface system 140 repeatedly invalidates the firmware update file received from the data processing system 102 for the same update, and provides indications of same to the data processing system 102, then the data processing system 102 can determine to change an aspect of the over-the-air update session. The data processing system 102 can determine to change, modify or otherwise alter an aspect of the over-the-air update session if the number of invalidations for the same update is greater than or equal to a threshold number (e.g., 3, 4, 5, 6, 7, 8 or more).

Aspects that the data processing system 102 can include, for example, which server of the data processing system 102 transfer the firmware update file, time of day the firmware update file is transferred, type of network used to transfer the firmware update file, encryption protocol, or network protocol. For example, the data processing system 102 can include multiple servers, such as a first server and a second server. The data processing system 102 can determine that the invalidations occurred when the first server transferred the firmware update file to the vehicle 138. The data processing system 102 can, responsive to determining the first server transferred the firmware update file that was invalidated, switch to or select a second server to transfer the firmware update file, and instruct the second server to perform the file transfer. The first and second servers may be located in the same or different data centers. The first and second servers can be located at different geographic locations.

The data processing system 102 can receive the indication of invalidation of the firmware update file from the vehicle and identify a first geographic location of the vehicle 138 when the vehicle 138 downloaded the firmware update file. The data processing system 102 can determine to block file transfers for vehicle 138 when the vehicle is located in the first geographic location. The data processing system 102 can identify a larger geographic region that includes the geographic location, and further block file transfers for any vehicle 138 located in the geographic region. The data processing system 102 can block file transfers to vehicles 138 in the geographic region responsive to receiving a number of indications of firmware invalidations for the geographic region that is greater than or equal to the threshold number of invalidations.

The data processing system 102 can transfer the firmware update file responsive to receiving an indication that the vehicle 138 is at a second geographic location outside the first geographic region. For example, the data processing system 102 or vehicle interface system 140 can set a geographic fence or boundary trigger corresponding to the first geographic region. When the vehicle 138 travels outside the geographic fence, it can trigger a notification to the data processing system 102 that indicates that the vehicle 138 has left the blocked first geographic location and entered a second geographic location that is authorized for file downloads. The data processing system 102 can transfer, responsive to the indication that the vehicle is at the second geographic location in the second geographic region, the firmware update file to the vehicle.

For example, the vehicle 138 can invalidate the firmware update file based on the first hash value being different from the second hash value; or the session ID received form the data processing system 102 being different from the session ID stored in the digital signature received from the blockchain; or based on the digital signature received from the blockchain being different from a vehicle generated digital signature generated by the vehicle by combining the session ID received from the data processing system and a computed hash of the firmware downloaded from the data processing system. The vehicle 138 can then transmit a second request for the firmware update file in order to restart the over-the-air update. The vehicle 138 can receive, responsive to the second request, a second session identifier and a second firmware update file from the data processing system 102. The vehicle 138 can receive a second digital signature from the blockchain system. The second digital signature can be generated by the data processing system 102 responsive to the second request from the vehicle 138. The vehicle 138 can determine a third hash value based on application of the hash function to the second firmware update file received responsive to the second request. The vehicle 138 can verify the second firmware update file received from the data processing system 102 based on a comparison of the first hash value with the third hash value, and a comparison of the second session identifier of the second digital signature with the second session identifier received from the data processing system. The vehicle 138 can verify the second firmware update file received from the data processing system 102 based on a comparison of the second digital signature received from the blockchain with a second vehicle generated digital signature generated based on combining the second session ID received form the data processing system and a hash of the firmware downloaded from the data processing system 102. The vehicle 138 can flash, responsive to verification, the component 156 of the vehicle 138 with the second firmware update file.

Figure 2:
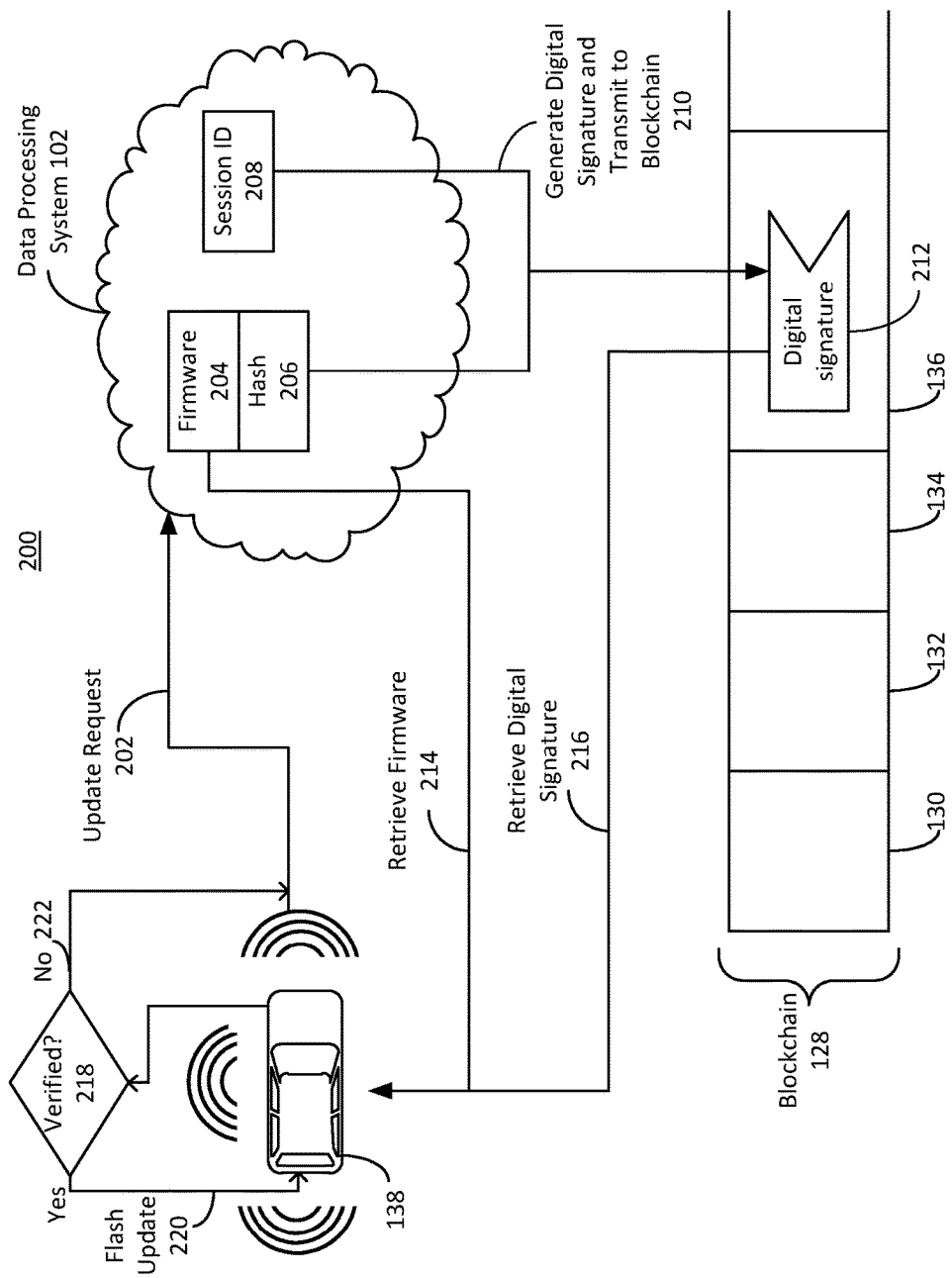
FIG. 2 depicts an example operational diagram of a system to perform secure firmware updates on a remote vehicle, in accordance with an embodiment.

FIG. 2 depicts an example operational diagram of a system to perform secure firmware updates on a remote vehicle. The operation 200 can be performed by one or more system, component or function depicted in FIG. 1 and FIG. 6. For example, the operation 200 can be performed by a data processing system, firmware controller component, and vehicle interface system. At ACT 202, the vehicle 138 transmits an update request to the data processing system 102. The update request can be for an over-the-air firmware update. The update request can be for firmware 204. The data processing system 102 can generate or identify a hash value 206 of the firmware 204. The data processing system 102 can identify or generate a session ID 208 for the over-the-air firmware update request. The data processing system 102 can combine the hash 206 with the session ID 208 to generate a digital signature 212 at ACT 210. The data processing system 102 can transmit the digital signature 212 to the blockchain 128 having a blockchain address assigned to the vehicle 138. The blockchain 128 can store the digital signature 212 in block 136. The blockchain 128 can generate a new block 136 for storage of the digital signature 212. At ACT 214, the vehicle 138 can retrieve the firmware 204 from the data processing system 102. The vehicle 138 can download the firmware 204 from the data processing system 102 via a network. At ACT 216, the vehicle can retrieve the digital signature 212 stored in the block 136 in blockchain 128 having the blockchain address assigned to the vehicle 138.

At decision block 218, the vehicle can determine whether the firmware file downloaded from the data processing system 102 at ACT 214 is verified to be identical to the firmware file 204 stored on the data processing system 102 (e.g., verify that the firmware was not altered during the transfer or download process at ACT 214). The vehicle 138 can verify the firmware by comparing the hash value of the retrieved firmware with the hash value stored in the digital signature retrieved from the blockchain 128. If the firmware is verified, then the vehicle 138 proceeds to ACT 220 and flashes the digital hardware component with the retrieved firmware. If, however, the firmware is not verified at block 218, then the vehicle 138 can proceed via ACT 222 to send a second or subsequent update request to the data processing system 102 to redo the over-the-air firmware update.

Figure 3:
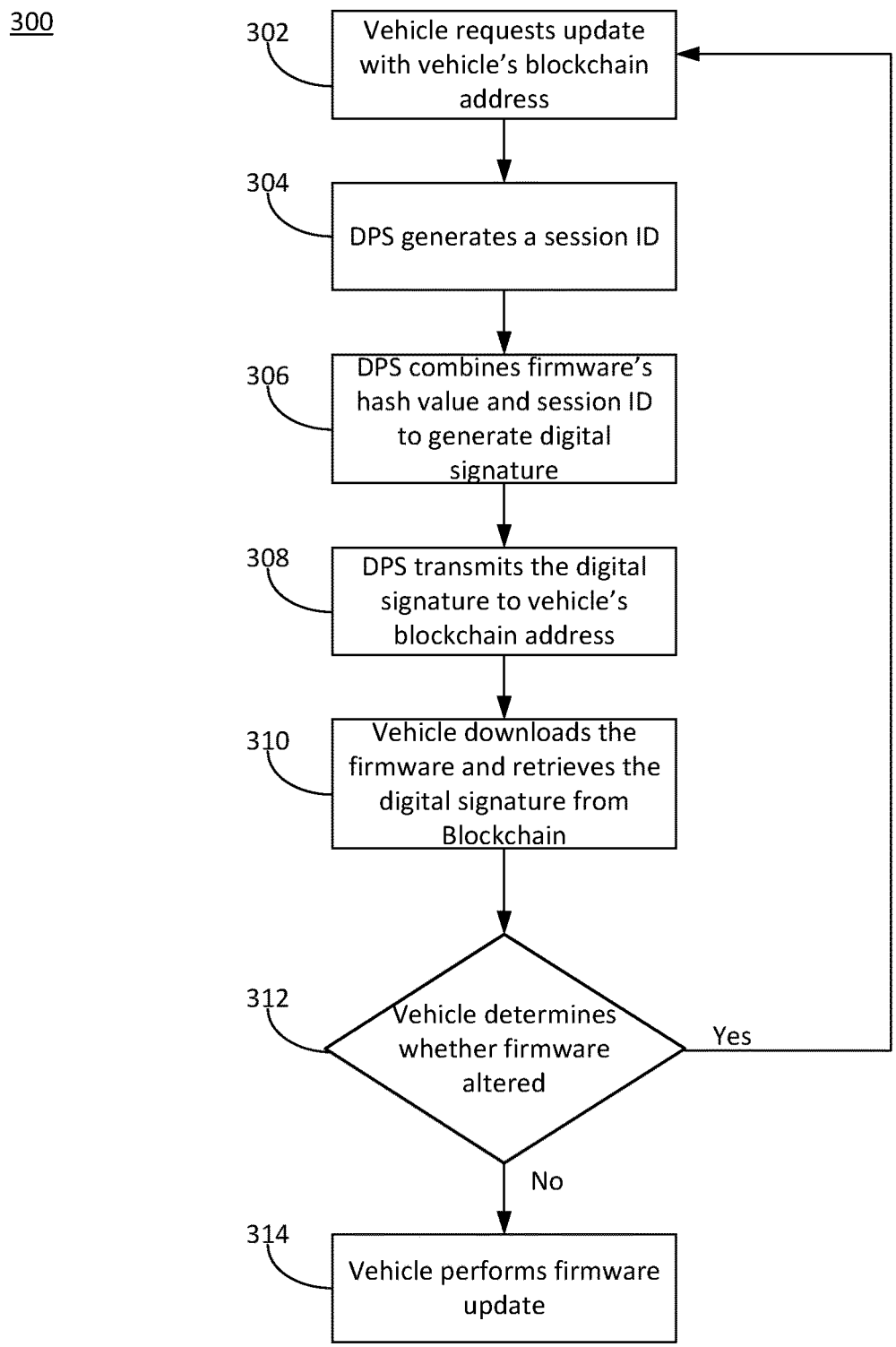
FIG. 3 depicts an example flow diagram of performing secure firmware updates on a remote vehicle, in accordance with an embodiment.

FIG. 3 depicts an example flow diagram of performing secure firmware updates on a remote vehicle, in accordance with an embodiment. The process 300 can be performed by one or more system, component or function depicted in FIG. 1, FIG. 2 and FIG. 6. For example, the process 300 can be performed by a data processing system, firmware controller component, and vehicle interface system. At ACT 302, the vehicle can request an update. The vehicle can request the update using a blockchain address assigned to the vehicle. At ACT 304, the data processing system ("DPS") can generate a session identifier for the over-the-air firmware update session corresponding to the request. At ACT 306, the data processing system can combine a hash value generated from the firmware with the session ID to generate a digital signature. The digital signature can be unique and correspond to the over-the-air update session with the vehicle.

At ACT 308, the data processing system can transmit the digital signature to a blockchain corresponding to the blockchain address assigned to the vehicle. The blockchain can store the digital signature in a new block in the blockchain. At ACT 310, the vehicle can download the firmware from the data processing system. The vehicle can query the blockchain using the blockchain address to retrieve the digital signature stored in the new block in the blockchain. At ACT 312, the vehicle can determine whether the firmware retrieved from the data processing system was altered or corrupted during the transfer, download or retrieval process. If the vehicle determines the firmware was altered or corrupted (e.g., based on the hash value of the retrieved firmware being different from the hash value stored in the digital signature retrieved from the blockchain), then the vehicle can return to ACT 302 and restart the over-the-air firmware update session. If the vehicle determine the firmware was not altered (e.g., verifies the firmware) at ACT 312, then the vehicle can proceed to ACT 314 and perform the firmware update.

Figure 4:
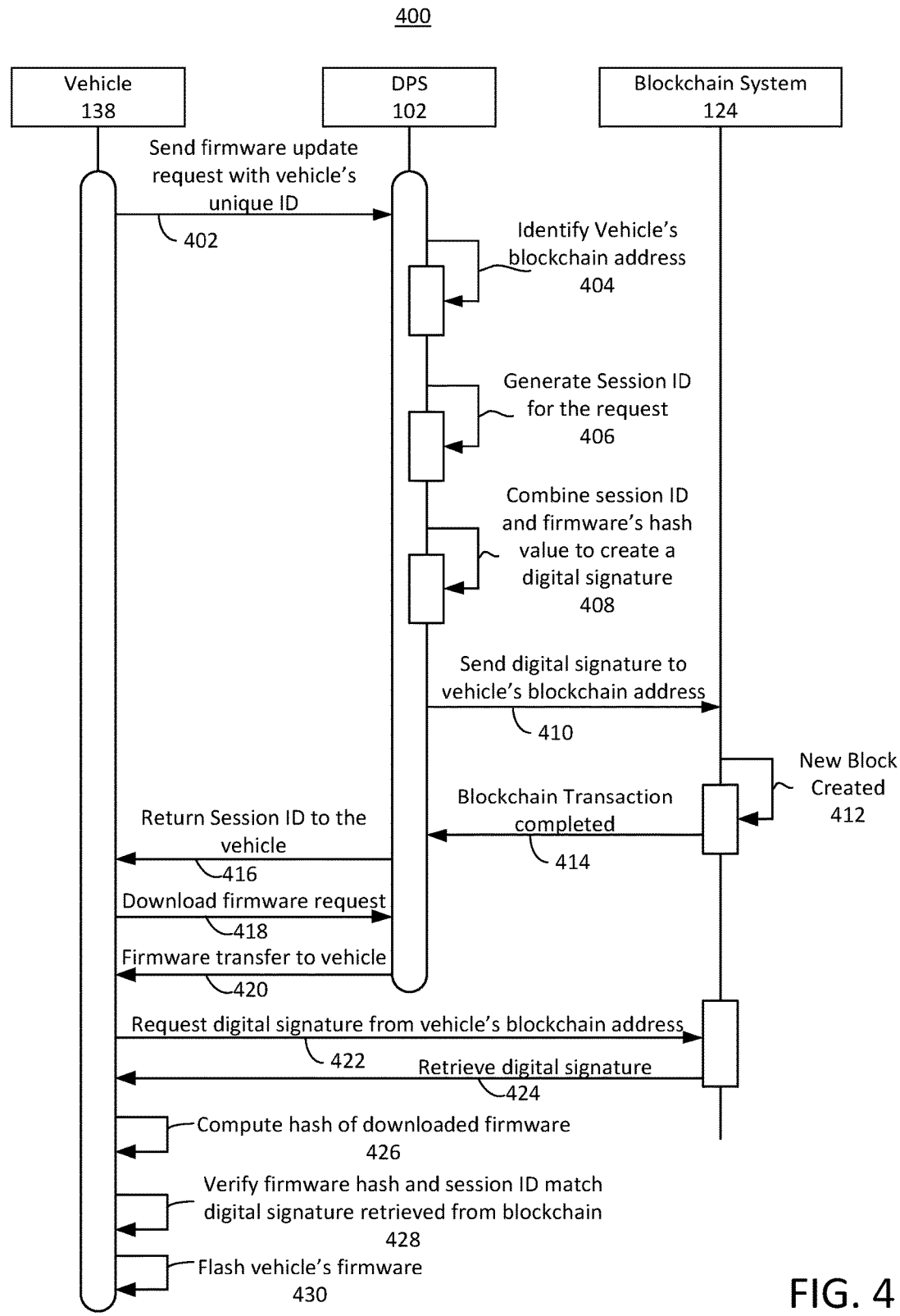
FIG. 4 depicts an example flow diagram performed by a system to perform secure firmware updates on a remote vehicle, in accordance with an embodiment.

FIG. 4 depicts an example flow diagram performed by a system to perform secure firmware updates on a remote vehicle, in accordance with an embodiment. The process 400 can be performed by one or more system, component or function depicted in FIG. 1, FIG. 2 and FIG. 6. At ACT 402, the vehicle 138 can send a firmware update request with a unique identifier of the vehicle 138. The unique identifier can include a VIN, blockchain address or other unique identifier associated with the vehicle 138. At ACT 404, the data processing system 102 can identify the vehicle's blockchain address. The data processing system 102 can identify the blockchain address if it was received with the request, or perform a lookup in a blockchain map using the unique identifier received with the request to identify the vehicle's blockchain address.

At ACT 406, the data processing system 102 can generate (e.g., via a session handler component) a session identifier for the request. The session identifier can be a unique session identifier. The session identifier can uniquely identify the over-the-air firmware update session with the vehicle 138 initiated by the request at ACT 402. At ACT 408, the data processing system 102 can combine the session identifier and the firmware's hash value to create a digital signature. The data processing system 102 can combine the session identifier with the firmware's hash value using a bidirectional encryption function or otherwise joining or combining the session identifier to the firmware hash value. For example, the digital signature can be a digital signature data structure with a first field for the session identifier and a second field for the hash value. The data processing system 102 can populate the data structure with the session identifier and the hash value in the respective fields.

At ACT 410, the data processing system 102 can send the digital signature to the blockchain system 124 to cause the blockchain system 124 to store the digital signature in a new block in a blockchain having the blockchain address corresponding to the vehicle 138. At ACT 412, the blockchain system 124 can create the new block and store the digital signature in the new block. At ACT 414, the blockchain system 124 can transmit an indication to the data processing system 102 that the blockchain transaction has been completed (e.g., the digital signature was stored in a new block in the blockchain).

At ACT 416, the data processing system 102 can provide the session ID generated at ACT 406 to the vehicle 138. The data processing system 102 can provide the session ID responsive to receiving the transaction completed indication at ACT 414. At ACT 418, the vehicle can send a download firmware request to the data processing system 102. The vehicle can send the download firmware request responsive to receiving the session ID at ACT 416. The download firmware request can include the session ID, which the data processing system 102 can use to select the firmware or confirm that the new block was created for the session ID before transferring the firmware. At ACT 420, the data processing system 102 can transfer the firmware to the vehicle 138. The data processing system 102 can transfer the firmware via a network.

At ACT 422, the vehicle 138 can request the digital signature from the vehicle's blockchain address. The vehicle 138 can query the blockchain system 124 for the data stored in the blockchain having the blockchain address assigned to the vehicle 138. The vehicle 138 can receive the digital signature from the blockchain at ACT 424. At ACT 426, the vehicle 138 can compute a hash of the downloaded firmware from ACT 420.

At ACT 428, the vehicle 138 can verify whether the firmware hash and the session ID match the digital signature retrieved from the blockchain 418. For example, the vehicle 138 can combine the session ID received from the data processing system 102 with the hash of the firmware file download at ACT 420 to generate a second digital signature. The vehicle 138 can compare this second digital signature with the digital signature retrieved from the blockchain system 124 (e.g., a first digital signature). If the vehicle 138 determines that the second digital signature matches the first digital signature (e.g., identical match), then the vehicle 138 can determine that the downloaded firmware was not altered or not corrupted, and then proceed to flash a component of the vehicle using the downloaded firmware at ACT 430.

If the vehicle 138 determines that the first and second digital signatures do not match, then the vehicle 138 can determine that the downloaded firmware file was altered or corrupted, and then discard the downloaded firmware. The vehicle 138 can return to ACT 402 and send a new firmware update request.

Figure 5:
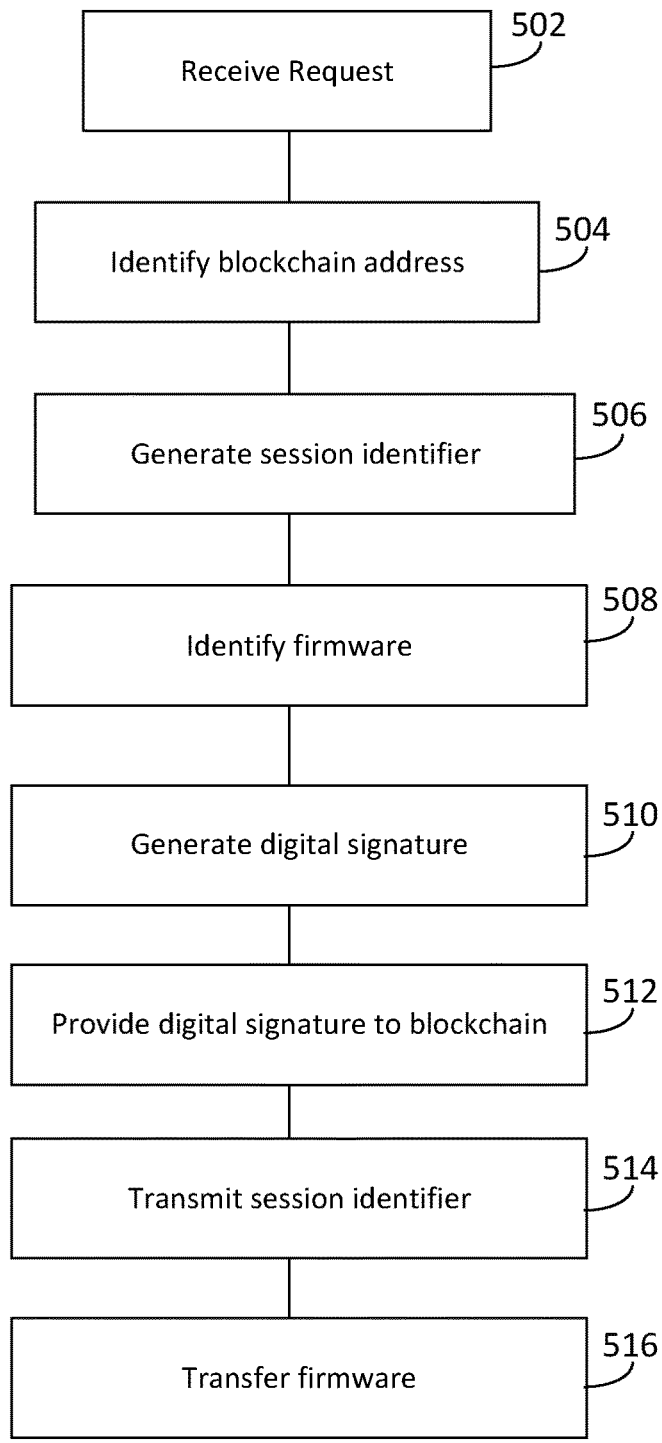
FIG. 5 depicts an example method of performing secure firmware updates on a remote vehicle, in accordance with an embodiment.

FIG. 5 depicts an example method of performing secure firmware updates on a remote vehicle, in accordance with an embodiment. The method 500 can be performed by one or more system, component or function depicted in FIG. 1, FIG. 2 and FIG. 6. At ACT 502, the data processing system can receive a request. The data processing system can receive the request via a vehicle interface (or vehicle interface system) executed or run by a vehicle. The request can be for an over-the-air update to a firmware executed by a component of the vehicle. The request can include information to facilitate performing the over-the-air update, such as a unique identifier of the vehicle, VIN, blockchain address, firmware version, location of the vehicle, or available network.

At ACT 504, the data processing system can identify a blockchain address for the vehicle. If the request includes the blockchain address, then the data processing system can identify the blockchain address for the vehicle from the request. If the request does not include the blockchain address, but instead includes another unique identifier of the vehicle, such as a VIN, the data processing system can perform a lookup in a blockchain map data structure to identify the blockchain address associated with the unique identifier of the vehicle. The blockchain address can be a secure, unique identifier. The blockchain address can be alphanumeric. The blockchain address can be assigned to the vehicle prior to the request. The blockchain address can be assigned upon manufacturing of the vehicle.

At ACT 506, the data processing system can generate a session identifier. The data processing system can generate the session identifier for the over-the-air firmware update session initiated by the request from the vehicle. The data processing system can generate the session identifier using one or more techniques. The session identifier can be a UUID. The session ID can be generated based on a time and date stamp associated with the request.

At ACT 508, the data processing system can identify firmware. The data processing system can identify the firmware update file responsive to the request from the vehicle. The data processing system can perform a lookup in a data repository to identify the firmware update file. The data processing system can identify the file name or file path for the firmware. The data processing system can identify the executable or other data file for the firmware. The data processing system can select or identify the firmware file based on information associated with the request or information about the vehicle stored in the data repository, such as the vehicle make, model, year, component, firmware version, geographic location of the vehicle, or geographic region for which the vehicle is configured to operate.

At ACT 510, the data processing system can generate a digital signature. The data processing system can generate the digital signature based on a combination of the session identifier and a first hash value generated via application of a hash function to the firmware update file. The data processing system can generate the digital signature using a bidirectional encryption function.

At ACT 512, the data processing system can provide the digital signature to a blockchain. The data processing system can cause the blockchain to store the digital signature in a block at the blockchain. The blockchain can have the blockchain address corresponding to the vehicle. The blockchain can create a new block to store the digital signature.

At ACT 514, the data processing system can transmit the session identifier to the vehicle. The data processing system can transmit the session identifier to the vehicle prior to or subsequent to providing the digital signature to the blockchain. The data processing system can transmit the session identifier responsive to receiving an indication from the blockchain that the digital signature was stored in a new block.

At ACT 516, the data processing system can transfer the firmware. The data processing system can transfer the firmware to the vehicle. The data processing system can transfer the firmware to the vehicle responsive to the vehicle sending a download request for the firmware. The vehicle can receive the firmware update file and verify, prior to installation, the firmware update file based on a comparison of the digital signature retrieved from the block at the blockchain address with a second hash value generated via application of the hash function to the firmware update file received from the data processing system and the session identifier received from the data processing system.

Figure 6:
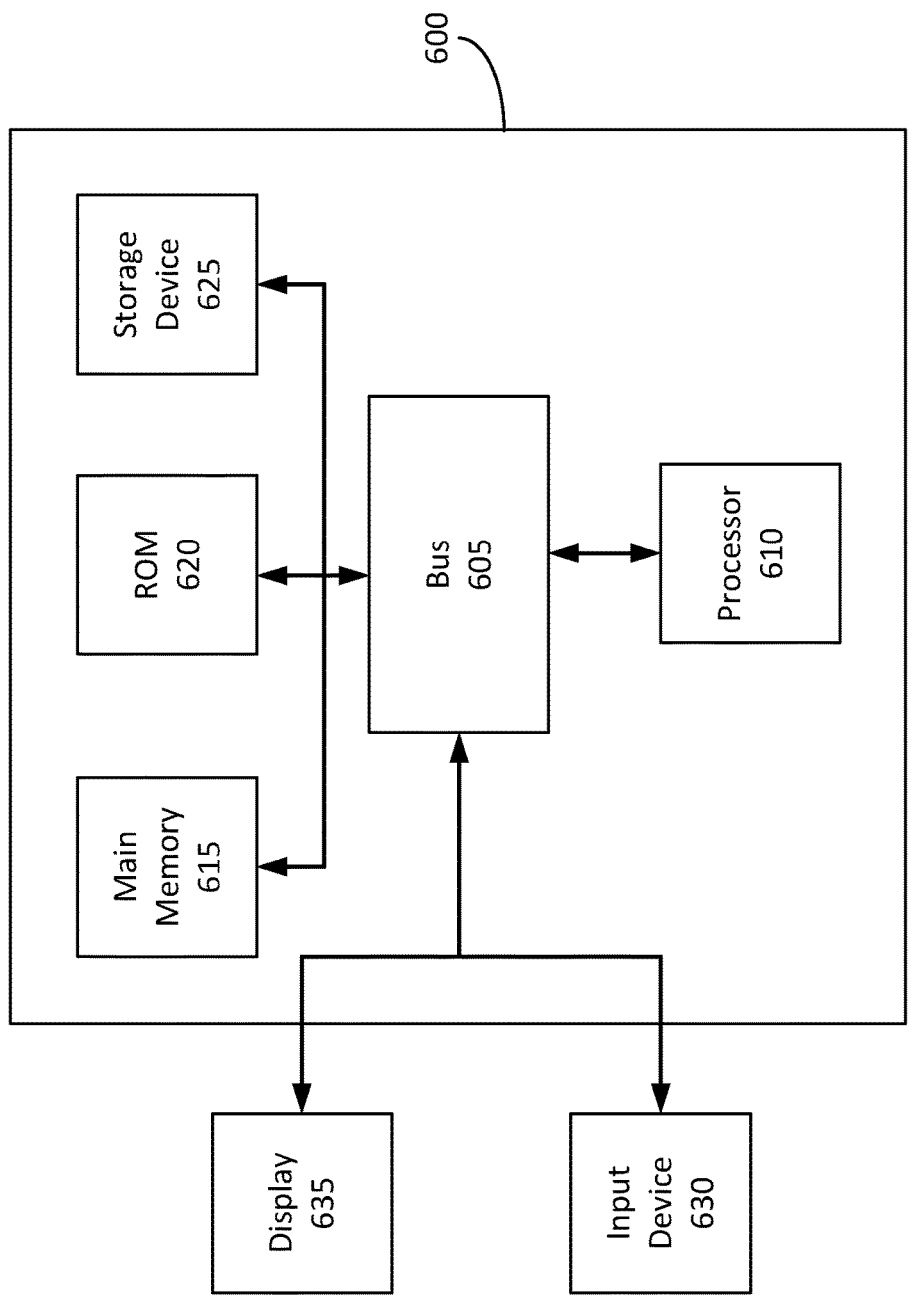
FIG. 6 is a block diagram illustrating an architecture for a computer system that can be employed to implement elements of the systems, flows and methods described and illustrated herein, including, for example, the system depicted in FIG. 1, operations, flows or examples depicted in FIGS. 2-4, and the method depicted in FIG. 5.

FIG. 6 is a block diagram of an example computer system 600. The computer system or computing device 600 can include or be used to implement the data processing system 102, or its components such as the data processing system 102. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be or include the memory 112. The main memory 615 can also be used for storing position information, vehicle information, command instructions, vehicle status information, environmental information within or external to the vehicle, road status or road condition information, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the memory 112.

The computing system 600 may be coupled via the bus 605 to a display 635, such as a liquid crystal display, or active matrix display, for displaying information to a user such as a driver of the first vehicle 138 or the second vehicle 102. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can be part of the data processing system 102, the sensor 142, or other component of FIG. 1, as well as part of the vehicle external to the data processing system 102, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., firmware controller component 108 and the hash component 110) illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to perform secure firmware updates on a remote vehicle, comprising:
   a data processing system comprising one or more processors and memory, a vehicle identification component, session handler component, firmware controller component, hash component and signature generation component, the data processing system to:
   receive a request via a vehicle interface for an update to a firmware executed by a component of a vehicle;
   identify a blockchain address for the vehicle based on the request;
   generate, responsive to the request, a session identifier for the request;
   identify a firmware update file responsive to the request;
   generate a digital signature based on a combination of the session identifier and a first hash value generated via application of a hash function to the firmware update file;
   provide, for storage in a block at the blockchain address managed by a blockchain system different from the data processing system, the digital signature;
   transmit the session identifier to the vehicle; and
   transfer the firmware update file to the vehicle, receipt of the firmware update file by the vehicle to cause the vehicle to verify, prior to installation, the firmware update file based on a comparison of the first hash value and the session identifier of the digital signature retrieved from the block at the blockchain address managed by the blockchain system with a second hash value generated via application of the hash function to the firmware update file received from the data processing system and the session identifier received from the data processing system.

2. The system of claim 1, comprising:
   the data processing system to receive the blockchain address for the vehicle along with the request.

3. The system of claim 1, comprising the data processing system to:
   receive a vehicle identification number ("VIN") along with the request; and
   perform a lookup in a database with the VIN to identify the blockchain address for the vehicle.

4. The system of claim 1, comprising:
   the data processing system to generate the first hash value of the firmware update file using an md5 hash function.

5. The system of claim 1, comprising:
   the data processing system to generate the first hash value of the firmware update file using a sha256 hash function.

6. The system of claim 1, comprising the data processing system to:
   receive an indication that the digital signature was stored in the block at the blockchain address;
   identify a transaction identifier corresponding to the digital signature stored at the blockchain address; and
   transmit the session identifier and the transaction identifier to the vehicle responsive to the indication that the digital signature was stored in the block at the blockchain address.

7. The system of claim 1, comprising the data processing system to:
   receive, from the vehicle, a request to download the firmware update file subsequent to transmitting the session identifier to the vehicle; and
   transfer the firmware update file to the vehicle responsive to the request to download the firmware update file.

8. The system of claim 1, comprising:
   the data processing system to assign the blockchain address to the vehicle at a vehicle manufacturing facility.

9. The system of claim 1, comprising:
   the data processing system to interface with the blockchain system to create the blockchain address and store the digital signature in the block at the blockchain address, the blockchain system comprising a distributed network of computing systems that store the blockchain address, wherein each block at the blockchain address comprises a cryptographic hash of a previous block in the blockchain address.

10. The system of claim 1, wherein the data processing system comprises a blockchain component, the data processing system to:
    to create the blockchain address and store the digital signature in the block at the blockchain address, wherein each block at the blockchain address comprises a cryptographic hash of a previous block in the blockchain address.

11. The system of claim 1, wherein the vehicle queries the blockchain system with a transaction identifier to obtain the digital signature, and verifies the firmware update file based on the first hash value matching the second hash value, and the session identifier from the digital signature matching the session identifier received from the data processing system.

12. The system of claim 1, wherein the vehicle invalidates the firmware update file based on at least one of the first hash value being different from the second hash value or the session identifier from the digital signature being different from the session identifier received from the data processing system.

13. The system of claim 1, comprising:
the data processing system to receive, subsequent to invalidation, by the vehicle, of the firmware update file transmitted to the vehicle, a second request via the vehicle interface for the update to the firmware executed by the component of the vehicle.

14. The system of claim 1, comprising the data processing system to:
receive an indication of invalidation, by the vehicle, of the firmware update file transmitted to the vehicle, the invalidation based on the first hash value being different from the second hash value;
identify a first server of the data processing system that transmitted the firmware update file;
select a second server different from the first server to transmit the firmware update file; and
instruct the second server to transmit the firmware update file to the vehicle.

15. The system of claim 1, comprising the data processing system to:
receive an indication of invalidation, by the vehicle, of the firmware update file transmitted to the vehicle, the invalidation based on the first hash value being different from the second hash value;
identify a first geographic location of the vehicle corresponding to the request;
block file transfers for a first geographic region corresponding to the first geographic location;
receive an indication that the vehicle is at a second geographic location outside the first geographic region; and
transfer, responsive to the indication that the vehicle is at the second geographic location, the firmware update file to the vehicle.

16. A method of performing secure firmware updates on a remote vehicle, comprising:
receiving, by a data processing system comprising at least one processor, a request via a vehicle interface for an update to a firmware executed by a component of a vehicle;
identifying, by the data processing system, a blockchain address for the vehicle;
generating, by the data processing system responsive to the request, a session identifier for the request;
identifying, by the data processing system, a firmware update file responsive to the request;
generating, by the data processing system, a digital signature based on a combination of the session identifier and a first hash value generated via application of a hash function to the firmware update file;
providing, by the data processing system for storage in a block at the blockchain address managed by a blockchain system different from the data processing system, the digital signature;
transmitting, by the data processing system, the session identifier to the vehicle; and
transferring, by the data processing system, the firmware update file to the vehicle, receipt of the firmware update file by the vehicle to cause the vehicle to verify, prior to installation, the firmware update file based on a comparison of the first hash value and the session identifier of the digital signature retrieved from the block at the blockchain address managed by the blockchain system with a second hash value generated via application of the hash function to the firmware update file received from the data processing system and the session identifier received from the data processing system.

17. The method of claim 16, comprising:
receiving, by the data processing system, a vehicle identification number ("VIN") along with the request; and
performing, by the data processing system, a lookup in a database with the VIN to identify the blockchain address for the vehicle.

18. The method of claim 16, comprising:
receiving, by the data processing system from the vehicle, a request to download the firmware update file subsequent to transmitting the session identifier to the vehicle; and
transferring, by the data processing system, the firmware update file to the vehicle responsive to the request to download the firmware update file.

19. A system to perform secure firmware updates on a remote vehicle, comprising:
a vehicle interface system comprising one or more processors and memory, a verification component, a blockchain interface component, and a hash component, the vehicle interface system to:
transmit, to a data processing system, a request for an update to a firmware executed by a component of a vehicle, the request indicating a blockchain address of the vehicle;
receive, from the data processing system, a session identifier generated for the request;
receive, from the data processing system, a transaction identifier corresponding to the data processing system storing a digital signature at the blockchain address of the vehicle, the digital signature storing a first hash value generated based on application of a hash function to a firmware update file, and the session identifier;
transmit, to the data processing system responsive to receipt of the session identifier, a request to download the firmware update file;
receive, from the data processing system, the firmware update file;
query a blockchain system with the transaction identifier, the blockchain system different from the data processing system;
receive, responsive to the query with the transaction identifier, the digital signature from the blockchain system;
determine a second hash value based on application of the hash function to the firmware update file; and
perform a verification of the firmware update file based on a comparison of the first hash value of the digital signature received from the blockchain system with the second hash value determined by the vehicle based on the firmware updated filed received from the data processing system, and a comparison of the session identifier of the digital signature received from the blockchain system and the session identifier received from the data processing system.

20. The system of claim 19, comprising the vehicle interface system to:
invalidate the firmware update file based on at least one of the first hash value being different from the second hash value or the session identifier from the digital signature being different from the session identifier received from the data processing system;

transmit a second request for the firmware update file;

receive, responsive to the second request, a second session identifier and a second firmware update file from the data processing system;

receive a second digital signature from the blockchain system, the second digital signature generated by the data processing system responsive to the second request;

determine a third hash value based on application of the hash function to the second firmware update file received responsive to the second request;

verify the second firmware update file received from the data processing system based on a comparison of the first hash value with the third hash value, and a comparison of the second session identifier of the second digital signature and the second session identifier received from the data processing system; and flash, responsive to verification, the component of the vehicle with the second firmware update file.

* * * * *